United States Patent [19]

Mason

[11] Patent Number: 5,526,900
[45] Date of Patent: Jun. 18, 1996

[54] VEHICLE FLUID CATCHER HAVING PLANAR SIDE WALLS WITH BENDABLE TOP PORTIONS

[76] Inventor: Randolph T. Mason, 16 Cigliano Aisle, Irvine, Calif. 92714

[21] Appl. No.: 446,542

[22] Filed: May 19, 1995

[51] Int. Cl.⁶ ............................................. F16N 31/00
[52] U.S. Cl. ................... 184/106.000; 184/6.24; 296/38; 141/86; 222/108; 180/69.1
[58] Field of Search .................... 184/6.24, 106; 296/38; 220/573; 123/198 E; 222/108; 141/86–88; 180/69.1

[56] References Cited

U.S. PATENT DOCUMENTS

| | | | |
|---|---|---|---|
| 2,732,024 | 1/1956 | Schonwald | 184/106 |
| 2,986,235 | 5/1961 | Weibert, Jr. | 184/106 |
| 4,084,655 | 4/1978 | Savron | 184/106 |
| 4,709,826 | 12/1987 | Wong | 180/69.1 |
| 5,404,848 | 4/1995 | Nelson | 184/106 |

FOREIGN PATENT DOCUMENTS

| | | | |
|---|---|---|---|
| 3905252 | 9/1990 | Germany | 296/38 |
| 9216786 | 10/1992 | WIPO | 184/106 |

Primary Examiner—Edward K. Look
Assistant Examiner—Christopher Verdier
Attorney, Agent, or Firm—Kenton R. Mullins

[57] ABSTRACT

The fluid catcher can be detachably secured to the underside of an automobile, using springs. Wire can also be used to securely hold the fluid catcher beneath the automobile when excessive weight is placed into the fluid catcher and the springs give way. For example, when a large amount of snow or water is introduced into the fluid catcher, the wires prevent the fluid catcher from dragging on the road surface. The fluid catcher includes raised front and rear walls to prevent introduction of road debris into the fluid catcher. Additionally, two sides of the fluid catcher may be bent by a user to allow the fluid catcher to snugly and securely conform to the underside of the automobile, or all four sides of the fluid catcher may be bent to conceal sharp edges. A nonflammable absorbent pad rests at the bottom of the fluid catcher for absorbing oil or other fluids, and a screen rests at an intermediate height between the nonflammable absorbent pad and the top of the fluid catcher. The intermediate-height positioning of the screen allows for cooling of fluids and further prevents clotting of fluids on the screen.

27 Claims, 2 Drawing Sheets

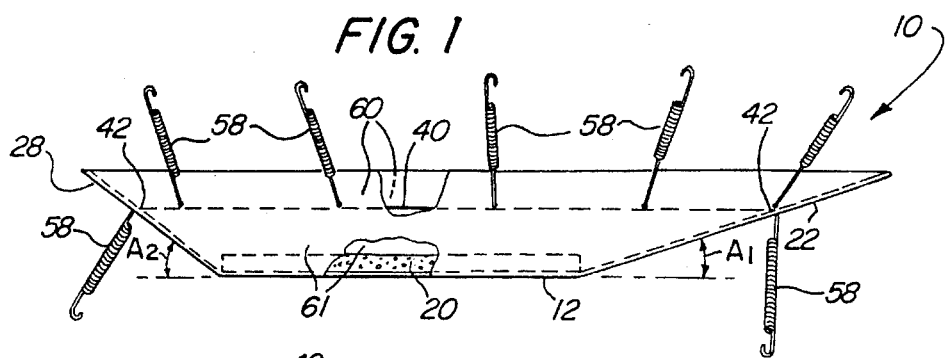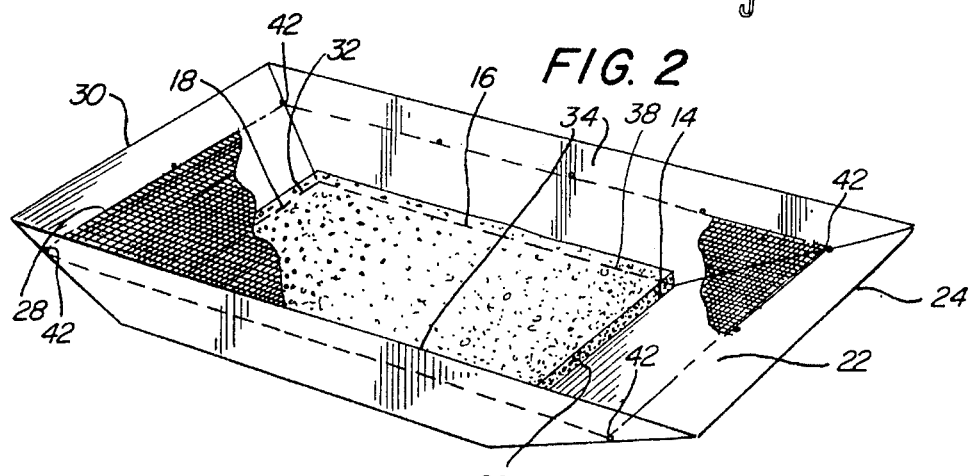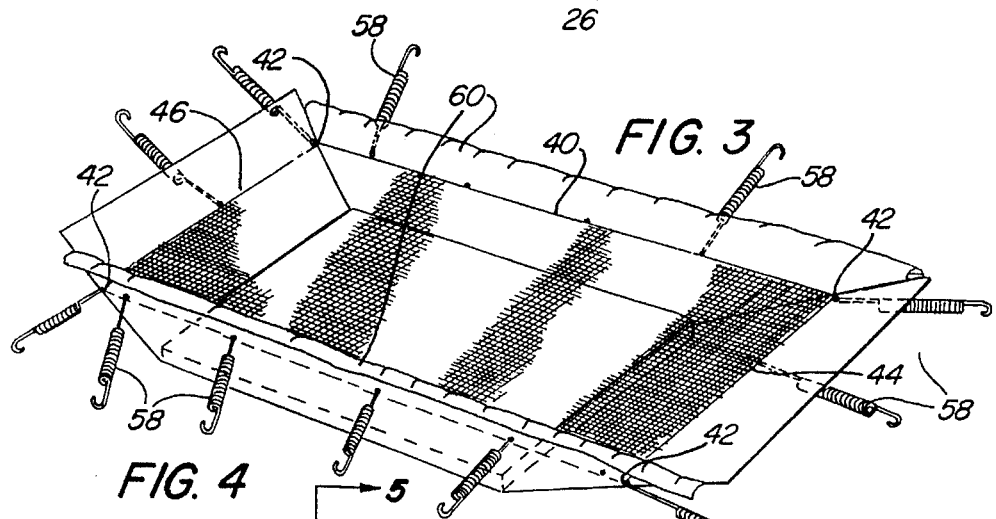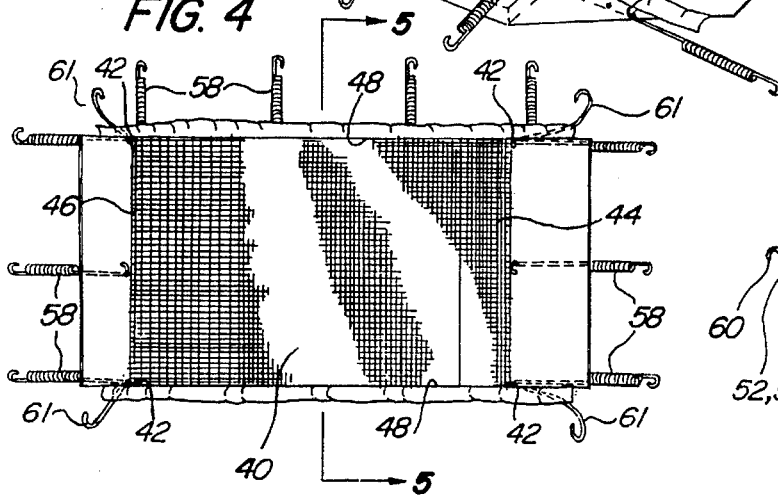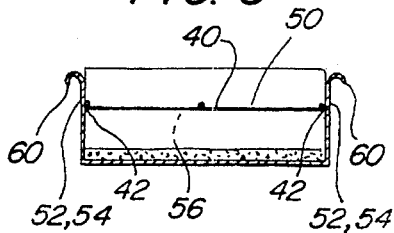

VEHICLE FLUID CATCHER HAVING PLANAR SIDE WALLS WITH BENDABLE TOP PORTIONS

BACKGROUND OF THE INVENTION

1. Field of the Invention

The present invention relates generally to fluid catchers and, more particularly, to fluid catchers removably detachable beneath automobiles for catching vehicle fluids.

2. Description of Related Art

Many fluid catchers have been disclosed in the prior art. U.S. Pat. No. 3,454,124 to Niedek discloses a device to be suspended beneath an automobile for absorbing drips and having a disposable element therein. U.S. Pat. No. 3,316,995 to Fay discloses another oil drip guard which can be suspended under an automobile using springs. U.S. Pat. No. 4,695,088 to Jensen discloses a small, rigid oil drip connector which can be secured to an oil pan using magnets. U.S. Pat. No. 3,785,451 to McCord discloses a flexible and fireproof automobile diaper which can be suspended beneath an automobile using wire.

U.S. Pat. No. 2,732,024 to Schonwald discloses a vehicle oil drip guard having an absorbent pad in the middle and springs which connect to a rigid circumferential member. U.S. Pat. No. 3,651,884 to Dorries discloses a rigid oil drip guard which can be firmly secured to the bottom of a vehicle using metal brackets. U.S. Pat. No. 2,783,848 to Beskid discloses an oil drip guard having inwardly-extending flanges above a nonflammable absorption pad.

U.S. Pat. No. 2,986,235 to Weibert, Jr. discloses an oil drip catcher having a shallow, rectangular sheet metal pan 11 and a lining consisting of a thin, flat rectangular pad 12 of matted metal fibers. U.S. Pat. No. 3,722,626 to Stack discloses an oil drip mat to be placed on the floor of a carport beneath an automobile. U.S. Pat. No. 4,798,754 to Tomak discloses another oil-absorbent floor mat. U.S. Pat. No. 1,630,639 to Taylor discloses a drip sheet positionable beneath a motor vehicle to catch the drippings of oil or grease and to convey the same for deposit at a distant point or into a suitable receptacle.

U.S. Pat. No. 4,084,655 to Savron discloses a drip tray adjustably secured beneath the engine of an automobile and arranged so as to allow cooling air to pass between the engine and the tray. None of these prior art references disclose a vehicle fluid catcher of simple, safe, and economic design with versatile functionality.

SUMMARY OF THE INVENTION

The fluid catcher of the present invention can be detachably secured to the underside of an automobile, using springs. Wire can also be used to securely hold the fluid catcher beneath the automobile when excessive weight is placed into the fluid catcher and the springs give way. For example, when a large amount of snow or water is introduced into the fluid catcher, the wires prevent the fluid catcher from dragging on the road surface. The fluid catcher includes raised front and rear walls to prevent introduction of road debris into the fluid catcher. Additionally, two sides of the fluid catcher may be bent by a user to allow the fluid catcher to snugly and securely conform to the underside of the automobile, or all four sides of the fluid catcher may be bent to conceal sharp edges. A nonflammable absorbent pad rests at the bottom of the fluid catcher for absorbing oil, grease, or other fluids, and a screen rests at an intermediate height between the nonflammable absorbent pad and the top of the fluid catcher. The intermediate-height positioning of the screen allows for cooling of fluids and further prevents clotting of fluids on the screen.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

FIG. 1 is a side view of the fluid catcher of the presently preferred embodiment;

FIG. 2 is a top planar view of the bottom and side walls of the fluid catcher of the presently preferred embodiment;

FIG. 3 is a cross-sectional view of the fluid catcher of the presently preferred embodiment with top portions of the two side walls bent to conform to the underside of an automobile;

FIG. 4 shows a top planar view of the fully-assembled fluid catcher of the presently preferred embodiment with the two top portions of the two side walls bent;

FIG. 5 is a front cross-sectional view of the fluid catcher of the presently preferred embodiment;

DETAILED DESCRIPTION OF THE PREFERRED EMBODIMENTS

Figure 6:
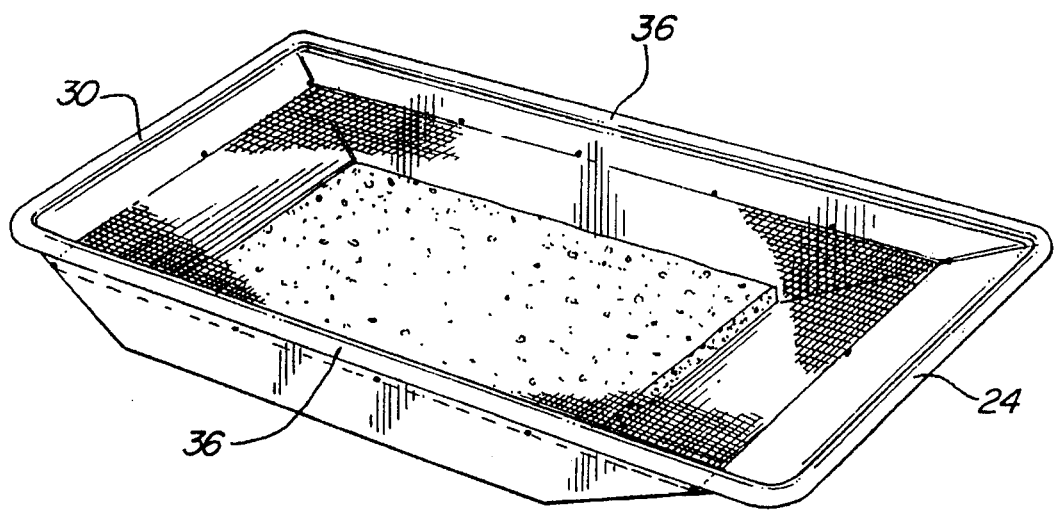
FIG. 6 is a perspective view of a fluid catcher according to a second preferred embodiment.

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically.

Turning to FIG. 1, a cross-sectional view of the fluid catcher 10 of the presently preferred embodiment is shown. FIG. 2 shows a top planar view of this fluid catcher 10. The fluid catcher 10 preferably comprises aluminum, but may be configured using other materials. The fluid catcher 10 comprises a semirigid planar bottom surface 12 and a planar nonflammable absorbent pad 20. The planar nonflammable absorbent pad 20 preferably has dimensions similar to that of the semirigid planar bottom surface 12 to allow the planar nonflammable absorbent pad 20 to snugly rest on the semirigid planar bottom surface 12.

Looking at FIG. 2, a semirigid planar front wall 22 and a semirigid planar rear wall 28 are secured to the semirigid planar bottom surface 12. Two semirigid planar side walls 34 are also secured to the semirigid planar bottom surface 12.

The semirigid planar front wall 22, the semirigid planar rear wall 28, the semirigid planar side walls 34, and the semirigid planar bottom surface 12 are all preferably formed from a single sheet of aluminum. These members may, however, be formed separately and secured by welding, for example.

The semirigid planar front wall 22 comprises an upper front wall edge 24 and a lower front wall edge 26. The lower front wall edge 26 is connected to the bottom front edge 14 of the semirigid planar bottom surface 12. Similarly, the semirigid planar rear wall 28 comprises an upper rear wall edge 30 and a lower rear wall edge 32, which connects to the bottom rear edge 18 of the semirigid planar bottom surface 12.

Each of the semirigid planar side walls 34 comprises an upper side wall edge 36 and a lower side wall edge 38. The lower side wall edge 38 of each semirigid planar side wall 34 connects to a corresponding bottom side edge 16 of the semirigid planar bottom surface 12.

In the presently preferred embodiment, the semirigid planar front wall 22 forms a first acute angle A1 with the semirigid planar bottom surface 12, and the semirigid planar rear wall 28 forms a second acute angle A2 with the semirigid planar bottom surface 12. The two acute angles A1 and A2 result in aerodynamic semirigid planar front and rear walls 22 and 28, respectively. In addition to providing low wind resistance, these semirigid front and rear walls 22 and 28, respectively, help rout fluids from the underside of a vehicle to the planar nonflammable absorbent pad 20. The front wall 22 is preferably half the length of the absorbent pad 20. As presently embodied, semirigid planar side walls 34 form perpendicular angles with the semirigid planar bottom surface 12.

The vertical semirigid planar side walls 34 of the fluid catcher 10 allow two fluid catchers 10 to be positioned under a wide automobile with corresponding semirigid planar side walls 34 contacting one another. Fluid catchers 10 may also be juxtaposed in alternative configurations. For example, an upper front wall edge 24 of one fluid catcher 10 may abut against either an upper rear wall edge 30 or an upper side wall edge 36 of another fluid catcher 10.

In the presently preferred embodiment, the size of the fluid catcher 10 has a sufficient length to span the approximate length of the underside of a vehicle from front bumper to rear bumper. The depth of the fluid catcher 10 of the presently preferred embodiment is preferably one to two inches. Other dimensions of fluid catchers 10 may be configured, preferably with lengths from one to four feet and widths ranging between one and three feet. The smaller lengths and widths allow fluid catchers 10 to be juxtaposed side by side, and further allow a small number of fluid catchers 10 to be used on a very large assortment of differently-sized vehicles.

A semirigid planar screen 40 is secured to the two semirigid planar side walls 34 between the upper portions 60 and the lower portions 61 of the semirigid planar side walls 34. The semirigid planar screen 40 lies in a plane which is parallel to the semirigid planar bottom surface 12.

Similarly, the semirigid planar screen 40 is secured to intermediate portions of the semirigid planar front wall 22 and the semirigid planar rear wall 28. Specifically, looking at FIG. 5, the semirigid planar screen 40 is secured to the first intermediate portion 50 of the semirigid planar front wall 22, to second and third intermediate portions 52, 54 of the two semirigid planar side walls 34, and to a fourth intermediate portion 56 of the semirigid planar rear wall 28.

Turning back to FIG. 1, primary securing means are attached to outer sides of the first intermediate portion 50 of the semirigid planar front wall 22, the second and third intermediate portions 52, 54 of the two semirigid planar side walls 34, and the fourth intermediate portion 56 of the semirigid planar rear wall 28. As presently embodied, the primary securing means 58 comprises springs, which are attached to the intermediate portions 50, 52, 54, and 56 using conventional means. The attachment of the springs 58 to the intermediate portions 50, 52, 54, and 56 securely hold the fluid catcher 10 against the underside of the vehicle. In the presently preferred embodiment, the springs are secured at the intermediate portions 50, 52, 54, and 56, instead of the upper front wall edge 24, upper side wall edges 36, and upper rear wall edge 30, to provide versatility in fit and function to the fluid catcher 10, as described below. Alternatively, the springs 58 may be secured elsewhere on the fluid catcher 10, such as the front and rear wall edges 24 and 30.

Turning to FIG. 3, the fluid catcher 10 of the presently preferred embodiment is shown with the upper portions 60 bent away from the center of the fluid catcher 10. Since the fluid catcher 10 is preferably made of aluminum, the upper portions 60 may be easily bent in order to allow corresponding semirigid planar side walls 34 to fit around automobile parts beneath the automobile or to fit snugly against the automobile parts. When the upper portions 60 are bent, the height of the fluid catcher 10 may be reduced, and greater clearance between the ground and the fluid catcher 10 may be achieved.

In the presently preferred embodiment, the semirigid planar screen 40 is surrounded by an upper cavity of air and a lower cavity of air. The upper cavity of air separates the underside of the automobile from the semirigid planar screen 40, and the lower cavity of air separates the semirigid planar screen 40 from the planar nonflammable absorbent pad 20. These two cavities of air may reduce clotting of fluids on the semirigid planar screen 40, and may further provide for cooling of the fluids before they contact the planar nonflammable absorbent pad 20. For example, a screen of the prior art may contact the exhaust pipe, and oil on the screen may travel back on the screen and contact the exhaust pipe, causing a fire hazard. The upper cavity of air of the present invention combats this problem by separating the screen from hot engine parts, for example.

The upper portions 60, alternatively, may only be slightly bent, or not bent at all, to provide a larger air space between the automobile and the semirigid planar screen 40. Alternatively, the upper portions 60 may be bent to allow portions of the semirigid planar screen 40 to contact the bottom of the automobile. In the latter case especially, the upper front wall edge 24 of the semirigid planar front wall 22 extends above the upper portions 60 to thereby prevent road debris and snow, for example, from entering the fluid catcher 10. The upper rear wall edge 30 of the semirigid planar rear wall 28 may also extend above the upper portions 60.

FIG. 5 shows upper portions 60 of the semirigid planar side walls 34 bent outwardly so that a snug fit is obtained and the upper front wall edge 24 and the upper rear wall edge 30 extend above the bent upper portions 60.

FIG. 4 shows a top planar view of the assembled fluid catcher 10. The springs 58 are positioned on all four sides of the fluid catcher 10, and are further positioned at the four corners of the fluid catcher 10. In an alternative embodiment, one or more springs may be attached to the upper front wall edge 24 and the upper rear wall edge 30 for securely holding these edges 24, 30 above the upper portions 60. Secondary securing means 61 may be used to ensure that the fluid catcher 10 does not fall to an unacceptable level beneath the automobile. For example, a large amount of snow, water, or other road debris entering the fluid catcher 10 may weigh the fluid catcher 10 above the capacity of the springs 58. In this situation, the secondary securing means 61 provide extra strength to hold the fluid catcher 10 snugly against the underside of the automobile.

Figure 7:
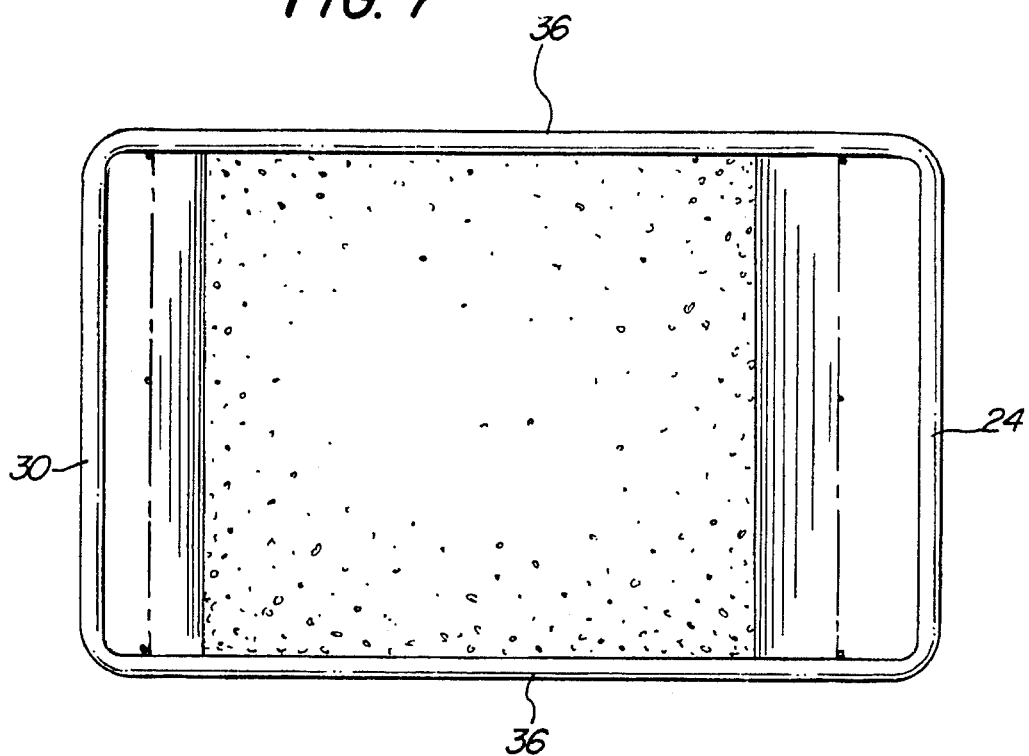
FIG. 7 is a top planar view of the fluid catcher according to the second preferred embodiment.

A second preferred embodiment is shown in FIGS. 6 and 7. The fluid catcher of these two figures is the same as that disclosed above, with the exception that the upper front wall edge 24, upper rear wall edge 30, and the two upper side wall edges 36 are bent downwardly. This prefabrication conceals the upper front wall edge 24, upper rear wall edge 30, and the two upper side wall edges 36, and thus may prevent injury of a user from the edges. The four corners between the upper front wall edge 24, upper rear wall edge 30, and the two upper side wall edges 36 may be integrally formed or may be added by welding, etc. The bent upper front wall edge 24, upper rear wall edge 30, and two upper side wall edges 36 may also add strength to the fluid catcher and, further, may avoid damage to the underside of the automobile from scratching, for example.

Those skilled in the art will appreciate that various adaptations and modifications of the just-described preferred embodiment can be configured without departing from the scope and spirit of the invention. For example, the semirigid planar side walls may extend at an angle other than 90 degrees relative to the bottom of the fluid catcher. Moreover, the primary securing means and/or the secondary securing means may comprise adjustable metal bands such as cable ties, straps, or wire, or any combination thereof. Therefore, it is to be understood that, within the scope of the appended claims, the invention may be practiced other than as specifically described herein.

What is claimed is:

1. A fluid catcher for detachably connecting to the underside of an automobile, the fluid catcher comprising:

a semirigid planar bottom surface having a rectangular perimeter comprising a bottom front edge, two bottom side edges, and a bottom rear edge, the semirigid planar bottom surface resting in a bottom-surface plane, which is generally parallel with a plane formed by a support surface upon which the automobile rests;

a planar nonflammable absorbent pad having a rectangular perimeter similar in dimensions to the rectangular perimeter of the semirigid planar bottom surface, the planar nonflammable absorbent pad fitting snugly on an upper surface of the semirigid planar bottom surface;

a semirigid planar front wall comprising an upper front wall edge and a lower front wall edge, the lower front wall edge being connected to the bottom front edge of the semirigid planar bottom surface, a plane formed by the semirigid planar front wall forming a first acute angle with the bottom-surface plane;

a semirigid planar rear wall comprising an upper rear wall edge and a lower rear wall edge, the lower rear wall edge being connected to the bottom rear edge of the semirigid planar bottom surface, a plane formed by the semirigid planar rear wall forming a second acute angle with the bottom-surface plane, the second acute angle being larger than the first acute angle;

two semirigid planar side walls, each semirigid planar side wall comprising an upper side wall edge and a lower side wall edge, each of the lower side wall edges being connected to a corresponding one of the two bottom side edges, the two semirigid planar side walls extending from the two bottom side edges and forming approximately perpendicular angles with the bottom-surface plane;

a semirigid planar screen having a rectangular perimeter comprising four screen corners and a screen front edge, two screen side edges, and a screen rear edge, the screen front edge being connected to a first intermediate portion located on the semirigid planar front wall between the upper front wall edge and the lower front wall edge, the two screen side edges being connected to second and third intermediate portions located on the two semirigid planar side walls between respective upper side wall edges and lower side wall edges, the screen rear edge being connected to a fourth intermediate portion located on the semirigid planar rear wall between the lower rear wall edge and the upper rear wall edge; and a plurality of springs connected to the semirigid planar front wall, the two semirigid planar side walls, and the semirigid planar rear wall, the plurality of springs being located approximately at the four screen corners of the semirigid planar screen rectangular perimeter and between the four screen corners of the semirigid planar screen rectangular perimeter, wherein the upper front wall edge, upper rear wall edge, and two side wall edges are bent away from a center of the fluid catcher and toward corresponding springs to thereby conceal the edges and attenuate injury therefrom.

2. The fluid catcher according to claim 1, wherein the springs are attached at the first, second, third, and fourth intermediate portions.

3. A fluid catcher adaptable to be secured beneath an automobile, comprising:

a semirigid reservoir having a bottom surface and side walls extending upwardly from the bottom surface, each side wall having a lower portion and an upper portion;

a nonflammable absorbent pad resting on the bottom surface; and a screen connected between the side walls, the screen being connected to the side walls between the lower and upper portions of the sidewalls, the screen resting below an upper portion of at least one of the side walls and not contacting the nonflammable absorbent pad, wherein the upper portions are bent away from a center of the fluid catcher to thereby conceal edges of the sidewalls and attenuate injury therefrom.

4. The fluid catcher according to claim 3, further comprising securing means connected to the sidewalls between the lower and upper portions, the securing means securing the reservoir beneath the automobile.

5. The fluid catcher according to claim 4, wherein the securing means comprises a plurality of springs.

6. The fluid catcher according to claim 5, wherein the screen has four corners, and wherein the springs are connected to the sidewalls at locations approximately corresponding to locations where the screen is connected to the sidewalls.

7. The fluid catcher according to claim 3, wherein the upper portion of at least one of the side walls are bent by a user in order to allow the screen to contact an engine of the automobile.

8. The fluid catcher according to claim 3, wherein the fluid catcher comprises aluminum.

9. The fluid catcher according to claim 3, wherein the side walls extending upwardly from the bottom surface comprise a front side wall and a rear side wall.

10. The fluid catcher according to claim 9, wherein the front side wall has a planar surface extending upwardly from the bottom surface at an angle less than 90 degrees relative to the bottom surface.

11. The fluid catcher according to claim 10, wherein the planar surface of the front side wall serves to route oil to the nonflammable absorbent pad, and further serves to reduce drag caused by wind resistance.

12. The fluid catcher according to claim 9, wherein the rear side wall has a planar surface extending upwardly from the bottom surface at an angle less than 90 degrees relative to the bottom surface.

13. The fluid catcher according to claim 12, wherein the rear side wall serves to reduce drag caused by wind resistance.

14. The fluid catcher according to claim 3, wherein the screen, resting below an upper portion of at least one of the side walls and not contacting the nonflammable absorbent pad, is surrounded by air to thereby reduce clotting of fluid on the screen or possibility of fire and further to provide for cooling of the fluid before the fluid contacts the nonflammable absorbent pad.

15. The fluid catcher according to claim 3, wherein a front wall of the fluid catcher has a length which is approximately half of a length of the nonflammable absorbent pad.

16. A fluid catcher adaptable to be secured beneath an automobile, comprising:

a reservoir having a bottom surface and side walls extending upwardly from the bottom surface;

a nonflammable absorbent pad resting on the bottom surface;

a screen connected to the side walls, the screen not contacting the nonflammable absorbent pad;

primary securing means connected to the side walls for securing the reservoir beneath the automobile; and secondary securing means connected to the side walls for securing the reservoir beneath the automobile in an event that the primary securing means fails, wherein the primary securing means comprises springs and the secondary securing means comprises wire or a metal band.

17. A fluid catcher adaptable to be secured beneath an automobile, comprising:

a rectangular reservoir having a bottom surface and side walls extending upwardly from the bottom surface, the rectangular reservoir having four upper sides and four upper corners located between the four upper sides;

a nonflammable absorbent pad resting on the bottom surface; and a screen connected to the side walls, the screen being located on intermediate portions of the side walls and not contacting the nonflammable absorbent pad;

securing means connected to each of the intermediate portions of the side walls for securing the reservoir beneath the automobile.

18. A fluid catcher for detachably connecting to the underside of an automobile, the fluid catcher comprising:

a semirigid planar bottom surface having a rectangular perimeter comprising a bottom front edge, two bottom side edges, and a bottom rear edge, the semirigid planar bottom surface resting in a bottom-surface plane, which is generally parallel with a plane formed by a support surface upon which the automobile rests;

a planar nonflammable absorbent pad having a rectangular perimeter similar in dimensions to the rectangular perimeter of the semirigid planar bottom surface, the planar nonflammable absorbent pad fitting snugly on an upper surface of the semirigid planar bottom surface;

a semirigid planar front wall comprising an upper front wall edge and a lower front wall edge, the lower front wall edge being connected to the bottom front edge of the semirigid planar bottom surface, a plane formed by the semirigid planar front wall forming a first acute angle with the bottom-surface plane;

a semirigid planar rear wall comprising an upper rear wall edge and a lower rear wall edge, the lower rear wall edge being connected to the bottom rear edge of the semirigid planar bottom surface, a plane formed by the semirigid planar rear wall forming a second acute angle with the bottom-surface plane, the second acute angle being larger than the first acute angle;

two semirigid planar side walls, each semirigid planar side wall comprising an upper side wall edge and a lower side wall edge, each of the lower side wall edges being connected to a corresponding one of the two bottom side edges, the two semirigid planar side walls extending from the two bottom side edges and forming approximately perpendicular angles with the bottom-surface plane;

a semirigid planar screen having a rectangular perimeter comprising four screen corners and a screen front edge, two screen side edges, and a screen rear edge, the screen front edge being connected to a first intermediate portion located on the semirigid planar front wall between the upper front wall edge and the lower front wall edge, the two screen side edges being connected to second and third intermediate portions located on the two semirigid planar side walls between respective upper side wall edges and lower side wall edges, the screen rear edge being connected to a fourth intermediate portion located on the semirigid planar rear wall between the lower rear wall edge and the upper rear wall edge; and a plurality of springs connected to the semirigid planar front wall, the two semirigid planar side walls, and the semirigid planar rear wall, the plurality of springs being located approximately at the four screen corners of the semirigid planar screen rectangular perimeter and between the four screen corners of the semirigid planar screen rectangular perimeter, wherein upper portions of the two semirigid planar side walls may be bent to snugly fit around portions of the underside of the automobile, the upper portions being located approximately between the upper side wall edges and the second and third intermediate portions, the bent upper portions decreasing vertical heights of the two semirigid planar side walls relative to vertical heights of the semirigid planar front wall and the semirigid planar rear wall, thus attenuating introduction of wind and debris into the fluid catcher.

19. The fluid catcher according to claim 18, wherein the springs are attached at the first, second, third, and fourth intermediate portions.

20. A fluid catcher adaptable to be secured beneath an automobile, comprising:

a semirigid reservoir having a bottom surface and side walls extending upwardly from the bottom surface, each side wall having a lower portion and an upper portion;

a nonflammable absorbent pad resting on the bottom surface; and a screen connected between the side walls, the screen being connected to the side walls between the lower and upper portions of the sidewalls, the screen resting below an upper portion of at least one of the side walls and not contacting the nonflammable absorbent pad, wherein an upper portion of at least one of the side walls are bent by a user in order to allow the side wall to conform to structure beneath the automobile.

21. The fluid catcher according to claim 20, further comprising securing means connected to the sidewalls between the lower and upper portions, the securing means securing the reservoir beneath the automobile.

22. The fluid catcher according to claim 21, wherein the securing means comprises a plurality of springs.

23. The fluid catcher according to claim 22, wherein the screen has four corners, and wherein the springs are connected to the sidewalls at locations approximately corresponding to locations where the screen is connected to the sidewalls.

24. The fluid catcher according to claim 23, wherein the springs are attached at the four screen corners and between the four screen corners.

25. The fluid catcher according to claim 20, wherein the fluid catcher may be configured to allow the screen to contact an engine of the automobile, or may be configured not to allow the screen to contact the engine of the automobile.

26. The fluid catcher according to claim 25, wherein the upper portion of at least one of the side walls are bent by a user in order to allow the screen to contact an engine of the automobile.

27. The fluid catcher according to claim 25, wherein the upper portion of at least one of the side walls may be bent in order to allow that side wall to fit around an automobile part beneath the automobile or to fit snugly against the automobile part, thus increasing a distance between a support surface upon which the vehicle rests and the fluid catcher.

\* \* \* \* \*